(12) United States Patent
Jang et al.

(10) Patent No.: US 12,430,734 B2
(45) Date of Patent: Sep. 30, 2025

(54) IMAGE PROCESSING DEVICE FOR DRONE, DRONE IMAGE PROCESSING METHOD, AND DRONE IMAGE PROCESSING PROCESSOR

(71) Applicant: SAMSUNG ELECTRONICS CO., LTD., Suwon-si (KR)

(72) Inventors: Inmo Jang, Suwon-si (KR); Suckhyun Lim, Suwon-si (KR); Hyunkook Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/196,713

(22) Filed: May 12, 2023

(65) Prior Publication Data
US 2023/0368356 A1    Nov. 16, 2023

(30) Foreign Application Priority Data

May 16, 2022  (KR) ................ 10-2022-0059853

(51) Int. Cl.
| | | |
|---|---|---|
| G06T 7/00 | (2017.01) | |
| G06T 5/70 | (2024.01) | |
| G06T 7/33 | (2017.01) | |
| G06T 7/90 | (2017.01) | |
| G06V 10/24 | (2022.01) | |
| G06V 10/25 | (2022.01) | |
| G06V 10/94 | (2022.01) | |

(52) U.S. Cl.
CPC ............ *G06T 7/0002* (2013.01); *G06T 5/70* (2024.01); *G06T 7/337* (2017.01); *G06T 7/90* (2017.01); *G06V 10/245* (2022.01); *G06V 10/25* (2022.01); *G06V 10/955* (2022.01); *G06T 2207/10024* (2013.01); *G06T 2207/10032* (2013.01); *G06T 2207/10048* (2013.01)

(58) Field of Classification Search
None
See application file for complete search history.

(56) References Cited

U.S. PATENT DOCUMENTS 9,858,478 B2    1/2018  Tatourian et al.
9,984,455 B1 *  5/2018  Fox ................. B64C 31/024
(Continued)

FOREIGN PATENT DOCUMENTS

KR        10-1751020 B1     7/2017
KR    10-2019-0013176 A    2/2019
(Continued)

*Primary Examiner* — Haris Sabah
(74) *Attorney, Agent, or Firm* — Sughrue Mion, PLLC

(57) ABSTRACT

An image processing device for drone includes a memory that receives and stores image data and a processor that performs pre-processing on the image data by separating the image data into thermal image data and real image data and performs image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

20 Claims, 15 Drawing Sheets

(56) References Cited

U.S. PATENT DOCUMENTS

| | | | |
|---|---|---|---|
| 10,679,098 B2 | 6/2020 | Gubbi Lakshminarasimha et al. | |
| 10,839,546 B2 | 11/2020 | Cho et al. | |
| 11,205,073 B2 | 12/2021 | Hartman et al. | |
| 11,227,382 B2 | 1/2022 | Nefian et al. | |
| 2018/0096541 A1* | 4/2018 | O'Brien | G06V 20/176 |
| 2019/0164009 A1* | 5/2019 | Gubbi Lakshminarasimha | G06T 7/254 |
| 2019/0392211 A1* | 12/2019 | Hartman | G06T 11/00 |
| 2022/0207871 A1* | 6/2022 | Ratcliffe | H04W 4/40 |
| 2022/0327676 A1 | 10/2022 | Shin et al. | |

FOREIGN PATENT DOCUMENTS

| | | |
|---|---|---|
| KR | 10-2156085 B1 | 9/2020 |
| KR | 10-2267764 B1 | 6/2021 |
| KR | 10-2330055 B1 | 11/2021 |

\* cited by examiner

IMAGE PROCESSING DEVICE FOR DRONE, DRONE IMAGE PROCESSING METHOD, AND DRONE IMAGE PROCESSING PROCESSOR

CROSS-REFERENCE TO RELATED APPLICATION

This application is based on and claims priority under 35 U.S.C. § 119 to Korean Patent Application No. 10-2022-0059853, filed on May 16, 2022, in the Korean Intellectual Property Office, the disclosure of which being incorporated by reference herein in its entirety.

BACKGROUND

The present disclosure relates to an image processing device for a drone, a drone image processing method, and a drone image processing processor, and more particularly, to a method of extracting a change point or an anomaly point by comparing a reference image with an image captured by a drone.

Image sensors capture a two-dimensional (2D) or three-dimensional (3D) image of an object. Image sensors generate an image of an object using a photoelectric conversion element, which reacts to the intensity of light reflected from the object. With the recent development of complementary metal-oxide semiconductor (CMOS) technology, CMOS image sensors using CMOS have been widely used.

CMOS image sensors are also used in drones, which capture images while flying. Images captured by a drone may vary with weather conditions, the flight status of the drone, or the image-capturing angle of the drone, and therefore, an image correction technique is advantageous.

SUMMARY

It is an aspect to provide an image processing method, by which images captured by a drone in various environments are processed and an error between a real image and a captured image is removed.

According to an aspect of one or more embodiments, there is provided an image processing device for drone. The image processing device includes a memory configured to receive and store image data and a processor configured to perform pre-processing on the image data by separating the image data into thermal image data and real image data and perform image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

According to another aspect of one or more embodiments, there is provided an image processing method performed by a drone. The image processing method includes capturing an external image to obtain image data and processing the image data, wherein the processing of the image data includes performing pre-processing on the image data by separating the image data into thermal image data and real image data and performing image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

According to yet another aspect of one or more embodiments, there is provided a drone image processing processor configured to perform pre-processing on image data by separating the image data into thermal image data and real image data and perform image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

BRIEF DESCRIPTION OF THE DRAWINGS

Various embodiments will be more clearly understood from the following detailed description taken in conjunction with the accompanying drawings, in which.

DETAILED DESCRIPTION

The terms used herein are described briefly, and embodiments are described in detail.

Figure 1:
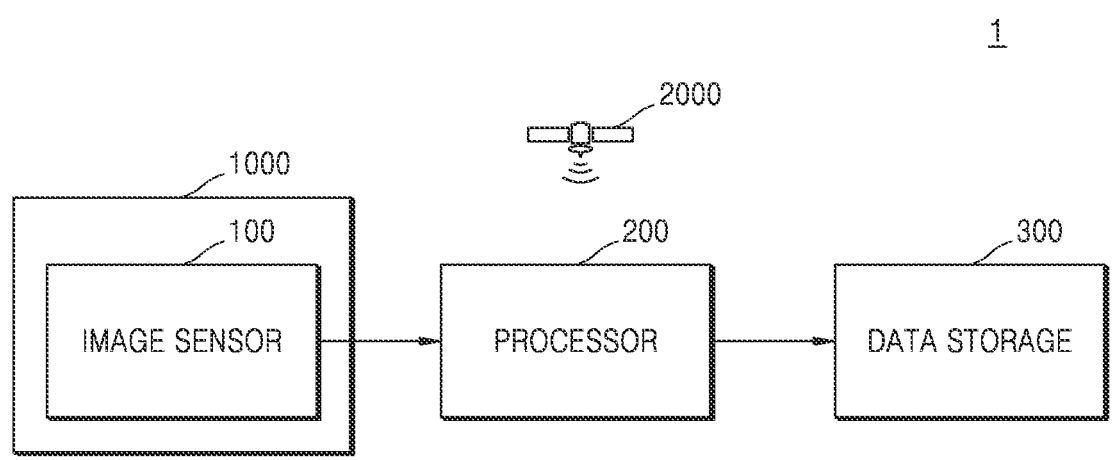
FIG. 1 is a block diagram of an image sensing system for a drone, according to some embodiments.

FIG. 1 is a block diagram of an image sensing system 1 for a drone, according to some embodiments.

Referring to FIG. 1, the image sensing system 1 for a drone may include an image sensor 100 mounted on a drone 1000, a processor 200, a communication satellite 2000, and a data storage 300.

The drone 1000 may include the image sensor 100 and capture a surrounding image. For example, the drone 1000 may film a surrounding site or a factory in a surrounding area while flying. Here, a captured external image may be of surroundings of a factory, such as a factory site, the roof of the factory, or the exterior of the factory, but is not limited thereto. According to some embodiments, the drone 1000 may use a real time Kinematic global positioning system (RTK-GPS) technology. A process, in which the drone 1000 captures an image of the surroundings thereof while communicating with a base station, is described in detail with reference to FIG. 8.

The image sensor 100 captures an image of the surroundings of the drone 1000. As described below, the image sensor 100 may include a thermal image sensor and/or a real image sensor. The image sensor 100 may be provided as a single unit and may simultaneously have both a thermal image sensing function and a real image sensing function. The image sensor 100 may capture external images at various angles according to the flight status of the drone 1000 or to a flight angle of the drone 1000 with respect to the surroundings. As described below, the image sensor 100 may be configured as a pixel array including a plurality of pixels PX and configured in a red, green, blue (RGB) pattern or a red, green, blue, yellow (LAB) pattern. The configuration of the image sensor 100 is described in detail with reference to FIG. 2.

In some embodiments, the processor 200 may be outside the drone 1000 and may receive image data from the image sensor 100 and process the image data.

The processor 200 may process data of a plurality of pixel values received from the image sensor 100. For example, in some embodiments, the processor 200 may be a microprocessor, a microcontroller, a CPU, or hardware control logic, and in some embodiments, the processor 200 may include more than one processor 200. The processor 200 may separate image data into thermal image data and real image data. The processor 200 may generate pixel comparison image data by comparing pixel data of thermal image data with pixel data of real image data and correct data, which corresponds to an edge of a pixel comparison image in the pixel comparison image data. The processor 200 may extract a change point from the corrected pixel comparison image data and determine whether a change in the change point is in a normal category. Accordingly, output image data resulting from image processing may be generated and output in certain units. The processor 200 may process image data by color. For example, when image data includes red, green, and blue pixel values, the processor 200 may process the red, green, and blue pixels in parallel or in series. The processor 200 may process image data by color in parallel and include a plurality of processing circuits. The operation of the processor 200 is described in detail with reference to FIG. 3.

The communication satellite 2000 may be outside the drone 1000 and may transmit, to the drone 1000, a signal related to the location of the drone 1000. For example, the communication satellite 2000 may transmit a global navigation satellite system (GNSS) signal to the drone 1000, and the drone 1000 may determine location information of an area, which is currently being filmed/imaged, based on the GNSS signal. The communication satellite 2000 may include a GPS satellite but is not limited thereto. According to some embodiments, the drone 1000 may implement an RTK-GPS function, which shares a real-time location with the communication satellite 2000.

The data storage 300 may be outside the drone 1000 and may share image data with the drone 1000. For example, because the data storage 300 is outside the drone 1000, the data storage 300 may be hardware having a relatively large storage capacity. The drone 1000 may store images, which are captured in real time, in the data storage 300 and may use the images stored in the data storage 300 when extracting a change point or an anomaly point from a captured image. For example, the data storage 300 may include a server outside the drone 1000. In this case, the drone 1000 may store captured images in an external server and retrieve an existing image of a currently filmed/imaged area from the external server through communication with the communication satellite 2000. The existing image retrieved from the external server may be used as a reference image for generation of changed pixel image data as described below. According to some embodiments, the configuration of the image sensor 100 is described in detail below.

Figure 2:
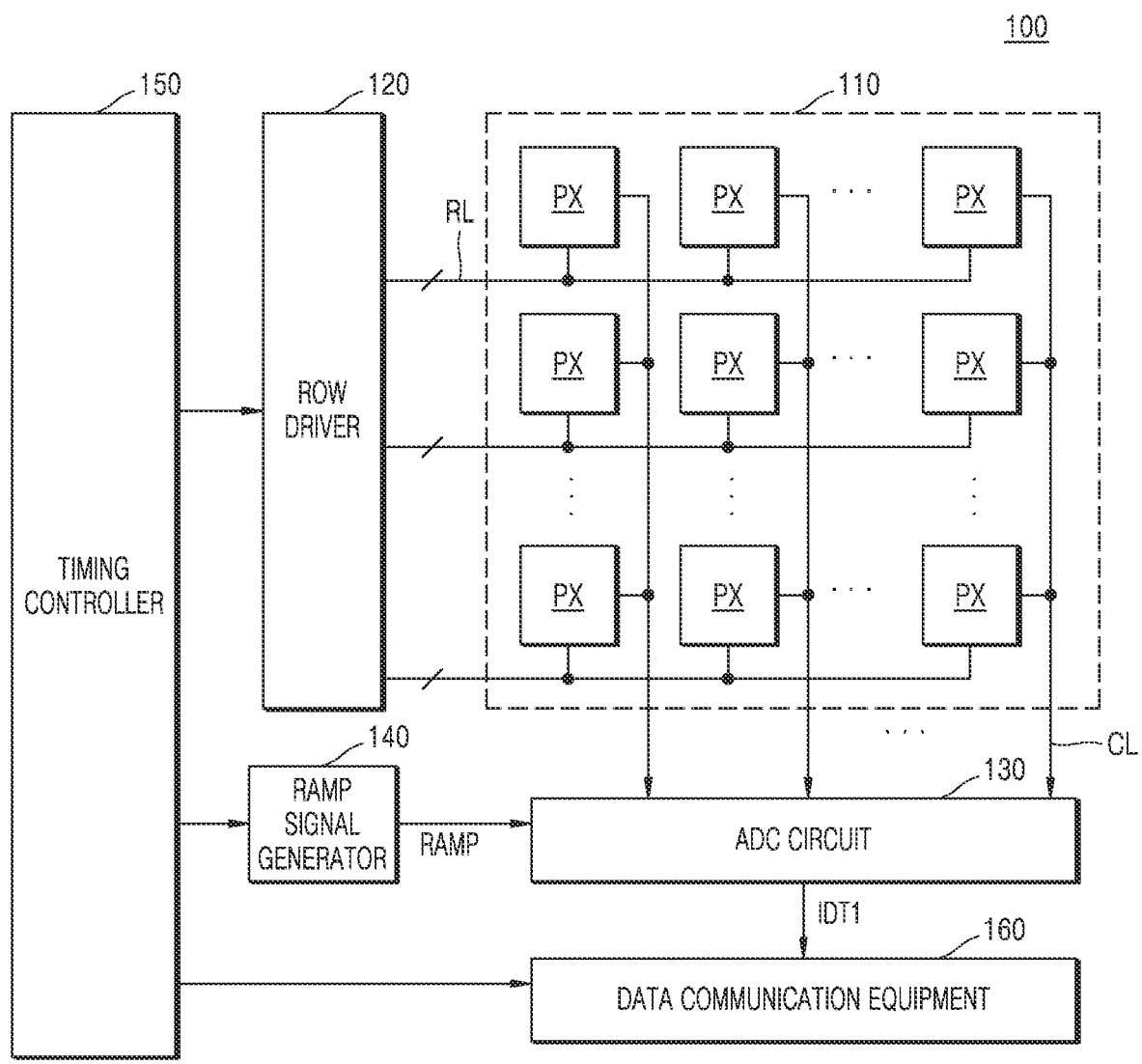
FIG. 2 illustrates a configuration of an image sensor according to some embodiments.

FIG. 2 illustrates the configuration of the image sensor 100 according to some embodiments.

Referring to FIG. 2, the image sensor 100 may include an image sensing unit 110, a row driver 120, an analog-to-digital converter (ADC) circuit 130, a ramp signal generator 140, a timing controller 150, and data communication equipment 160.

The image sensing unit 110 may have a thermal image sensing function and a real image sensing function. The image sensing unit 110 may be configured as a pixel array including the pixels PX. For example, the image sensing unit 110 may include the pixels PX in a matrix and a plurality of row lines RL and column lines CL, which are connected to the pixels PX. Each of the pixels PX may include at least one photoelectric conversion element (or photosensitive device). The photoelectric conversion element may sense light and convert the light into photocharge. For example, the photoelectric conversion element may include a photosensitive device, such as an inorganic photodiode, an organic photodiode, a Perovskite photodiode, a photo transistor, a photogate, or a pinned photodiode, which includes an organic or inorganic material. In some embodiments, each of the pixels PX may include a plurality of photoelectric conversion elements. A plurality of photosensitive devices may be arranged in the same layer or stacked on each other in a vertical direction.

A microlens for light collection may be provided above each of the pixels PX or above a pixel group including adjacent pixels PX. Each of the pixels PX may sense light in a particular spectrum from light received through the microlens.

According to some embodiments, the image sensing unit 110 may include pixels in an RGB pattern or red, green, blue, white color (RGBWC) pattern. According to some embodiments, the image sensing unit 110 may include a LAB pattern. For example, the image sensing unit 110 may include a red pixel converting light in a red spectrum into an electrical signal, a green pixel converting light in a green spectrum into an electrical signal, and a blue pixel converting light in a blue spectrum into an electrical signal. The image sensing unit 110 may include a white pixel, which converts light having all of a component in the red spectrum, a component in the green spectrum, and a component in the blue spectrum into an electrical signal. A color filter, which transmits light in a particular spectrum, may be disposed above each of the pixels PX. However, embodiments are not limited thereto. The image sensing unit 110 may include pixels, which convert light in spectrums other than the red, green, and blue spectrums into electrical signals.

According to some embodiments, the pixels PX may have a multi-layer structure. Each of the pixels PX having a multi-layer structure may include stacked photosensitive devices each converting light in a different spectrum into an electrical signal so that electrical signals respectively corresponding to different colors may be generated from the photosensitive devices. In other words, electrical signals respectively corresponding to different colors may be output from a single pixel PX.

The image sensing unit 110 may include the row lines RL and the column lines CL. Each of the row lines RL may extend in a row direction and may be connected to pixels PX in one row. For example, each of the row lines RL may transmit control signals from the row driver 120 to a plurality of elements, e.g., transistors, which are included in each pixel PX.

Each of the column lines CL may extend in a column direction and may be connected to pixels PX in one column. The column lines CL may respectively transmit pixel signals, e.g., reset signals and sensing signals, which are output from pixels PX in each row of the image sensing unit 110, to the ADC circuit 130.

Under control by the timing controller 150, the row driver 120 may generate control signals for driving the image sensing unit 110 and provide the control signals to the pixels PX of the image sensing unit 110 through the row lines RL. The row driver 120 may control the pixels PX of the image sensing unit 110 to sense incident light simultaneously or row-by-row. The row driver 120 may select pixels PX of a row or at least two rows and may control the selected pixels PX to output pixel signals through the column lines CL.

The ADC circuit 130 may receive pixel signals, which are read out from pixels PX of a row selected by the row driver 120 among the plurality of pixels PX of the image sensing unit 110, and convert the pixel signals into pixel values corresponding to digital data.

The ADC circuit 130 may generate and output first image data IDT1, e.g., raw image data, in row units by converting pixel signals, which are received from the image sensing unit 110 through the column lines CL, into digital data, based on a ramp signal RAMP from the ramp signal generator 140.

The ADC circuit 130 may include a plurality of ADCs respectively corresponding to the column lines CL. Each of the ADCs may compare a pixel signal, which is received through one of the column lines CL that corresponds to each ADC, with the ramp signal RAMP and may generate a pixel value based on a result of the comparison. For example, an ADC may remove a reset signal from a sensed signal by using correlated double sampling (CDS) and may generate a pixel value indicating the amount of light sensed by a pixel PX.

The ramp signal generator 140 may generate the ramp signal RAMP, which increases or decreases with a certain slope, and provide the ramp signal RAMP to the ADC circuit 130.

The timing controller 150 may control the timings of other elements, e.g., the row driver 120, the ADC circuit 130, the ramp signal generator 140, and the data communication equipment 160, of the image sensor 100. The timing controller 150 may provide a timing signal, which indicates an operation timing, to each of the row driver 120, the ADC circuit 130, the ramp signal generator 140, and the data communication equipment 160.

The data communication equipment 160 may transmit image data to the outside of the image sensor 100. For example, the data communication equipment 160 may transmit captured image data to the processor 200 and/or the communication satellite 2000. The data communication equipment 160 may receive a drone control signal from the outside of the image sensor 100.

The image sensor 100 may be mounted on an electronic device having an image sensing function and/or an optical sensing function. For example, the image sensor 100 may be mounted on an electronic device, such as a camera, a smartphone, a wearable device, an Internet of things (IoT) device, an appliance, a tablet personal computer (PC), a personal digital assistant (PDA), a portable multimedia player (PMP), a navigation device, a drone, or an advanced drivers assistance system (ADAS). The image sensor 100 may also be mounted on electronic devices that are used as components of vehicles, furniture, manufacturing facilities, doors, or various kinds of measuring equipment.

Figure 3:
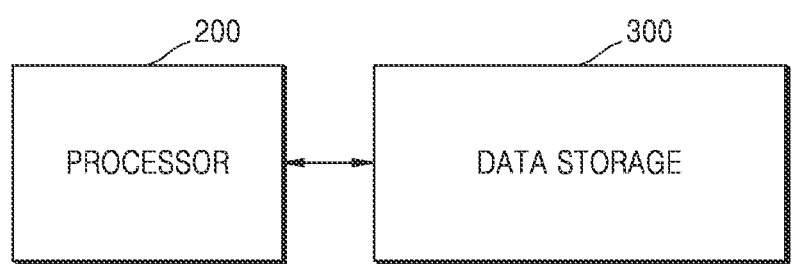
FIG. 3 is a block diagram of an image processing device according to some embodiments.

FIG. 3 is a block diagram of an image processing device 2 according to some embodiments.

Referring to FIG. 3, the image processing device 2 may include the processor 200 and the data storage 300.

The processor 200 may receive and process image data. The processor 200 may perform pre-processing and main processing on the image data. Here, the pre-processing may be defined as a first step, and the main processing may be defined as an image processing step. For example, in some embodiments, the image processing step may follow the first step.

The processor 200 may perform pre-processing on image data received from the image sensor 100. According to some embodiments, the pre-processing may include separating the image data into thermal image data and real image data and aligning a thermal image with a real image, based on a reference image. In some embodiments, the reference image may be stored in advance. The pre-processing may also include setting a region of interest and a non-region of interest (i.e., a region of non-interest) in each of the thermal and real images and performing correction of an edge portion of the region of interest. The pre-processing is described in detail with reference to FIGS. 4 and 5.

The processor 200 may remove noise from the thermal image data and the real image data, which result from the pre-processing, to perform the main processing on the image data. The processor 200 may use Gaussian blurring to remove noise from the image data, but embodiments are not limited thereto. The processor 200 may convert the image data into a color mode to perform the main processing on the image data. For example, the processor 200 may convert the image data from an RGB pattern into a LAB pattern. However, the color mode is not limited to those described above, and a color mode and color sensitivity may be determined by user customization. In some embodiments, the color mode may be preset.

The processor 200 may generate pixel comparison image data, based on a first pixel value difference between reference image data and thermal image data that has undergone color mode conversion and a second pixel value difference between the reference image data and real image data that has undergone the color mode conversion. In some embodiments, the reference image data may be preset. For example, the reference image data may have been stored in the data storage 300 in advance. The processor 200 may mask a non-region of interest, which has been set in the pre-processing, when generating the pixel comparison image data. For example, the processor 200 may determine a pixel value of the non-region of interest to be 0 and extract a change point or an anomaly point from a region of interest.

The processor 200 may divide a corrected pixel comparison image into "n" equal parts, compare reference image data with thermal image data and real image data of each of the "n" equal parts of the pixel comparison image, and extract a change point or an anomaly point from the thermal image data and the real image data. That is, the processor 200 may divide the corrected pixel comparison image into the "n" equal parts, and may compare the reference image data with the thermal image data and the real image data and extract the change point on a part by part basis.

The processor 200 may process thermal image data and real image data and divide each of a thermal image and a real image into "n" equal parts. Each of the "n" equal parts of the thermal image and each of the "n" equal parts of the real image may be compared with the reference image pixel-by-pixel. The processor 200 may update pixel comparison image data by comparing a reference image with local regions of each of a thermal image and a real image. Here, the processor 200 may detect a change point according to a standard, which may be a K-means algorithm. The standard may be predetermined.

For example, the processor 200 may identify a region including a change point, which has a highest pixel value, among change points in a thermal image and change points in a real image, in order to complement a result of the pre-processing and extract a change point or an anomaly point significant for generating final image data. In some embodiments, the processor 200 may repeatedly perform an operation of masking a region of a pixel comparison image, in which a pixel value difference between a reference image and each of a thermal image and a real image is 0, and extracting a change point from the masked region of the pixel comparison image. In this operation, the processor 200 may divide the pixel comparison image into "n" equal parts and compare each of the "n" equal parts of the pixel comparison image with the reference image. In other words, the processor 200 may reduce a change point error or an anomaly point error by locally performing main processing on "n" equal parts of an image.

The processor 200 may determine and extract a change point or an anomaly point from image data, according to some embodiments. In some embodiments, the change point may include a temperature change point and a color change point. In some embodiments, the change point may be defined as a pixel, which has a higher pixel value than adjacent pixels or has a pixel value exceeding a threshold value. In some embodiments, the threshold value may be preset. In some embodiments, the threshold value may be an average pixel value of a reference image but is not limited thereto. For example, when pixels in one region of image data have higher pixel values than pixels in adjacent regions of the image data, the processor 200 may determine the pixels in the region to be candidate change points. The processor 200 may determine a final change point by applying a certain algorithm to the candidate change points. In some embodiments, the certain algorithm may be the K-means algorithm but is not limited thereto. An operation of determining a change point or an anomaly point is described in detail with reference to FIG. 6.

The data storage 300 may be outside the drone 1000 and may share image data with the drone 1000. The data storage 300 may be configured as a memory device. A program for implementing an image processing method according to some embodiments may be stored in the data storage 300. The data storage 300 may enable the processor 200 to process an image received from the outside based on an image processing program stored therein.

An image processing method performed by the processor 200 is described below.

Figure 4:
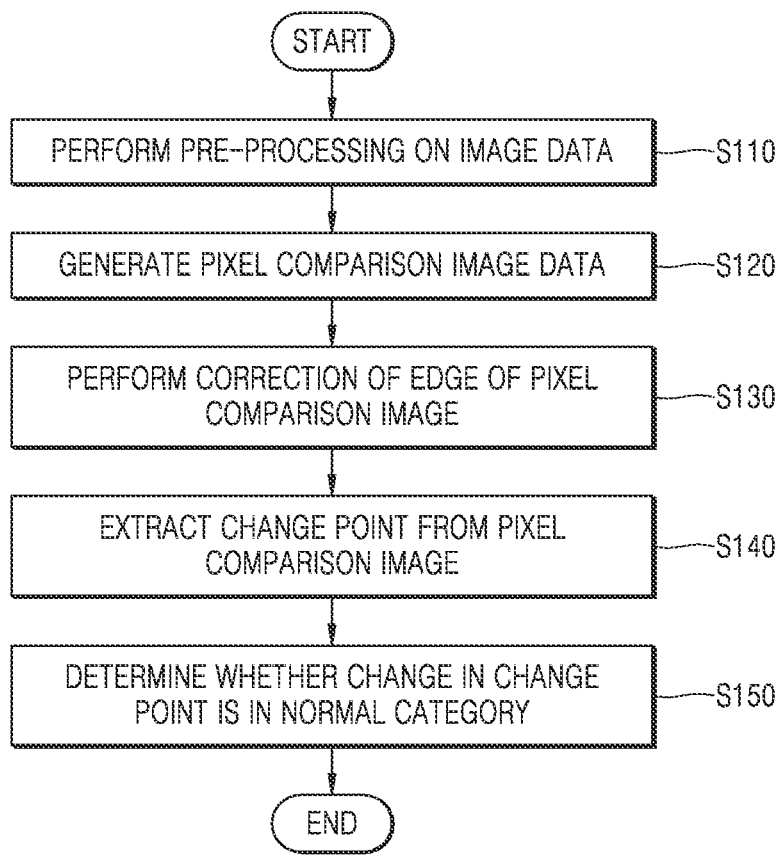
FIG. 4 is a flowchart of an image processing method according to some embodiments.

FIG. 4 is a flowchart of an image processing method according to some embodiments.

Referring to FIG. 4, the processor 200 may perform pre-processing on image data, which is received from the image sensor 100, in operation S110. The pre-processing may include separating the image data into thermal image data and real image data and aligning a thermal image with a real image by processing the thermal image data and the real image data. In some embodiments, the pre-processing may include setting a region of interest in each of the thermal and real images and removing an edge portion from each of the thermal and real images that have been aligned. The pre-processing of the image data is described in detail with reference to FIG. 5.

After the pre-processing of the image data, the processor 200 may generate pixel comparison image data in operation S120. The pixel comparison image data may be generated based on a difference between a reference image and a newly captured image, which is obtained by comparing the reference image with the image pixel-by-pixel. In some embodiments, the reference image may be pre-stored. The processor 200 may remove noise from the thermal image data and the real image data to generate the pixel comparison image data. To remove noise from the thermal image data and the real image data, the processor 200 may use Gaussian blurring. In some embodiments, the thermal image data may be used to extract a temperature change point from a captured image, and the real image data may be used to extract a color change point from the captured image. The processor 200 may convert a color mode, which is used in generating the pixel comparison image data, into a LAB mode. When generating the pixel comparison image data, the processor 200 may define a region other than the region of interest, which is set during the pre-processing, to be a non-region of interest and may mask the non-region of interest. For example, the processor 200 may process a pixel value of the non-region of interest as 0. When the pixel comparison image data is generated, the processor 200 may perform main processing on the image data.

When the pixel comparison image data is generated, the processor 200 may perform correction of an edge portion of a pixel comparison image in operation S130. The processor 200 may determine, as an edge portion, a portion which is erroneously processed in each of the thermal and real images aligned during the pre-processing. For example, points in each of the thermal and real images aligned during the pre-processing may be determined to be change points even though the points are not change points. Such fake change points may appear in the form of an edge, and the processor 200 may remove an edge portion, which is determined to be fake change points. In some embodiments, the processor 200 may perform edge correction with respect to polygonal images by using a canny edge detection function, but embodiments are not limited thereto. Other various functions may be used.

After the correction of the edge portion of the pixel comparison image is performed, the processor 200 may extract a change point from the pixel comparison image in operation S140. In some embodiments, the change point refers to not a fake change point but a real change point. In some embodiments, the change point may include both a temperature change point and a color change point. The real change point may include a pixel, which has a highest value in the pixel comparison image data.

According to some embodiments, the processor 200 may update the pixel comparison image data by comparing the reference image with local regions of each of the thermal image and the real image. In some embodiments, the processor 200 may detect a change point according to a standard, which may be the K-means algorithm. The standard may be predetermined. In some embodiments, when "x" points are determined to be change points in the pixel comparison image data, the K-means algorithm may be applied to the "x" change points, and the "x" change points may be divided into three groups. Change points in a group, which has a lowest pixel value among the three groups, may be determined to be fake change points. Change points in a group, which has a highest pixel value or a pixel value exceeding a certain threshold value among the three groups, may be determined to be real change points. In some embodiments, the threshold value may be determined by user customization. As the pixel comparison image data is updated, the processor 200 may remove the fake change points and include only the real change points in the pixel comparison image data. Although it has been described above that the processor 200 processes the thermal image data and the real image data and divides each of the thermal and real images into three groups of change points, embodiments are not limited thereto. Each of the thermal and real images may be divided by "n" into "n" groups of change points, wherein "n" groups of change points correspond to "n" equal parts of each of the thermal and real images. Each of the "n" equal parts of each of the thermal and real images may be compared with the reference image pixel-by-pixel.

When change points are extracted from the pixel comparison image data, the processor 200 may determine whether a change in each change point is in a normal category in operation S150. When it is determined that the change in the change point is not in a normal category, the processor 200 may determine that the change point is an anomaly point. The processor 200 may turn anomaly point data into big data and determine an anomaly point based on deep learning. For example, the processor 200 may turn change points in a normal category and change points outside the normal category into big data and may learn anomaly points, based on data of the change points turned into the big data. As a result of the learning, the processor 200 may update the characteristics of anomaly points and automatically extract an anomaly point from image data.

Figure 5:
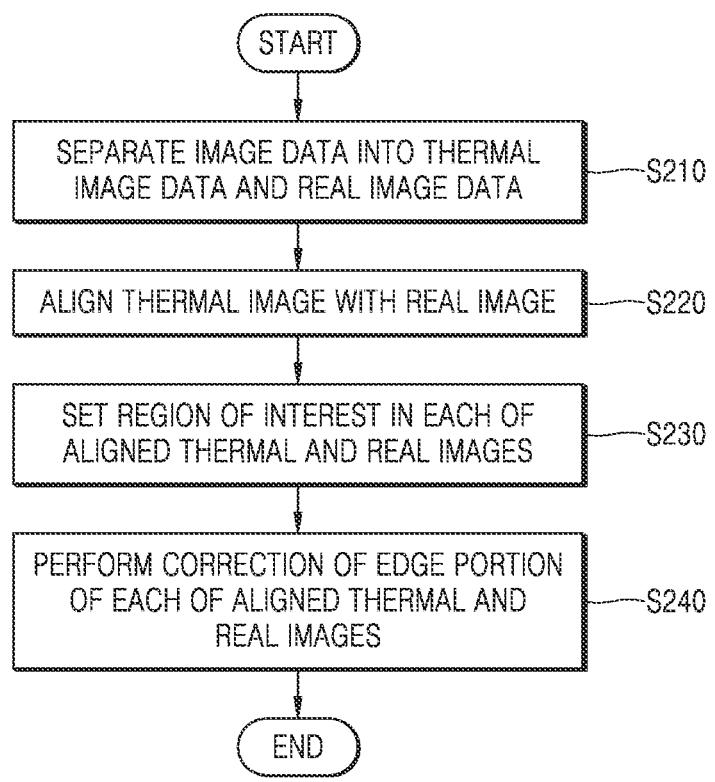
FIG. 5 is a flowchart of pre-processing of image data in an image processing method, according to some embodiments.

FIG. 5 is a flowchart of pre-processing of image data in an image processing method, according to some embodiments.

Referring to FIG. 5, the processor 200 may separate image data into thermal image data and real image data in operation S210. The thermal image data may be used to extract a temperature change point, and the real image data may be used to extract a color change point.

Thereafter, the processor 200 may align a thermal image with a real image in operation S220. The thermal image may be aligned with the real image, based on a reference image. The reference image may be pre-stored. In some embodiments, the reference image may be derived from learning from captured images using machine learning such as an artificial intelligence (AI) engine.

For example, the processor 200 may put an alignment reference mark on a structure in the reference image and compare the thermal image and the real image with the reference image, based on the alignment reference mark. In some embodiments, the structure in the reference image may include a factory, a building, topography, or a natural object in the reference image but is not limited thereto. The structure in the reference image may include any material objects in the reference image. The alignment reference mark may include a dot, a line, or a face. For example, when the alignment reference mark is put on a wall in a factory site in the reference image, the processor 200 may determine a line, which appears as the wall in the reference image is viewed from above, to be an alignment reference and may display the alignment reference mark having a line shape. When the alignment reference mark is displayed, the processor 200 may recognize a position and compare the thermal image and the real image with the reference image, based on the alignment reference mark. As a result, the processor 200 may accurately perform image alignment based on the alignment reference mark. To update the reference image, the processor 200 may continuously learn from captured images using machine learning. After the thermal image is aligned with the real image, the processor 200 may set a region of interest in each of the aligned thermal image and the aligned real image in operation S230. The processor 200 may set a region of interest in each of the thermal image and the real image, based on a region of interest set by user customization. The processor 200 may set, as a non-region of interest, a region other than the region of interest.

After the region of interest is set in each of the aligned thermal image and the aligned real image, the processor 200 may perform correction of an edge portion of each of the aligned thermal image and the aligned real image. According to some embodiments, when correction is performed on thermal image data and real image data in correspondence to the regions of a reference image, the edge of the reference image may not coincide with the edge of the thermal image or the real image. Consequently, a pixel value of the edge portion in each of corrected thermal image data and corrected real image data may be determined to be 0. The processor 200 may carry out the pre-processing of the image data by performing correction, in which the edge portion is removed from each of the corrected thermal image data and the corrected real image data.

The processor 200 may locally perform image alignment after performing the correction of the edge portion. For example, the processor 200 may perform image alignment by dividing an entire image, which has undergone edge correction, into "n" local images and comparing each of the "n" local images with a corresponding part of a reference image. In some embodiments, the processor 200 may compare a pixel value of a local image, which has undergone edge correction, with a pixel value of an image, which has undergone additional image alignment, and update a pixel value of image data to a lower pixel value as a result of the comparison.

Figure 6:
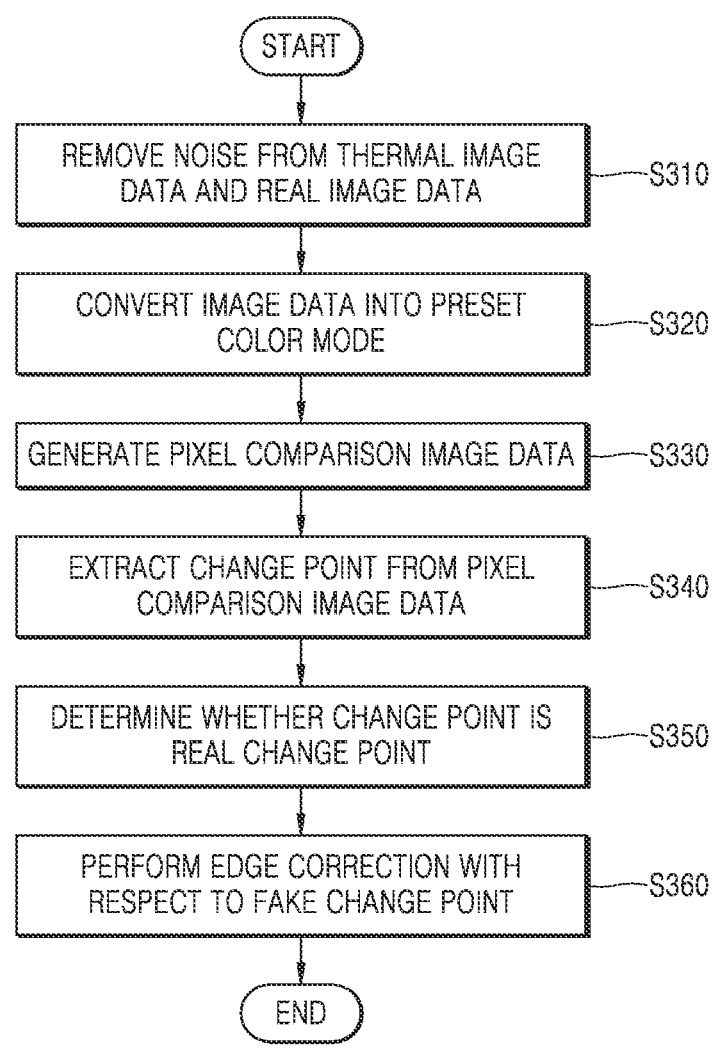
FIG. 6 is a flowchart of main processing of image data in an image processing method, according to some embodiments.

FIG. 6 is a flowchart of main processing of image data in an image processing method, according to some embodiments.

Referring to FIG. 6, the processor 200 may remove noise from thermal image data and real image data in operation S310. To generate pixel comparison image data, the processor 200 may remove noise from the thermal image data and the real image data. To remove noise from the thermal image data and the real image data, the processor 200 may use Gaussian blurring, but embodiments are not limited thereto.

The processor 200 may convert the image data into a color mode in operation S320. For example, the processor 200 may convert a color mode, which is used to generate pixel comparison image data, from an RGB pattern into a LAB mode. The color mode may be preset.

After noise is removed from the image data and the color mode of the image data is converted, the processor 200 may generate pixel comparison image data in operation S330. The processor 200 may generate the pixel comparison image data by comparing a pixel value of each of the thermal image data and the real image data with a pixel value of reference image data. For example, the processor 200 may generate a pixel comparison image, based on a value resulting from subtracting a pixel value of a reference image from a pixel value of a newly captured image. Among the pixels of the newly captured image in the pixel comparison image, a pixel having a different value than a pixel of the reference image may have a relatively high value. Among the pixels of the newly captured image in the pixel comparison image, a pixel having the same value as a pixel of the reference image may have a value that approximates 0.

After the pixel comparison image data is generated, the processor 200 may extract one or more change points from the pixel comparison image data in operation S340. As described above, because the pixel comparison image data is generated based on the value resulting from subtracting a pixel value of the reference image from a pixel value of the newly captured image, a pixel of the newly captured image, which has a different value than a pixel of the reference image, may have a relatively high value. The processor 200 may determine, as a change point, a pixel having a relatively high value in the pixel comparison image data. For example, in some embodiments, the processor 200 may compare the pixel value with a threshold value to determine the pixel having a relatively high value. The processor 200 may repeatedly perform an operation of generating pixel comparison image data. The processor 200 may process the thermal image data and the real image data and divide a thermal image and a real image into "n" equal parts. Each of the "n" equal parts of each of the thermal and real images may be compared with the reference image pixel-by-pixel. The processor 200 may update the pixel comparison image data by comparing the reference image with local parts of each of the thermal and real images.

After one or more change points are extracted from the pixel comparison image data, the processor 200 may determine whether each of the change points is a real change point in operation S350. In some embodiments, the processor 200 may detect a change point according to a standard, which may be the K-means algorithm. The standard may be predetermined. For example, when "x" points are determined to be change points in the pixel comparison image data, the K-means algorithm may be applied to the "x" change points, and the "x" change points may be divided into three groups. Change points in a group, which have lowest pixel values among the three groups, may be determined to be fake change points. Change points in a group, which have highest pixel values or pixel values exceeding a certain threshold value among the three groups, may be determined to be real change points. In some embodiments, the threshold value may be determined by user customization. As the pixel comparison image data is updated, the processor 200 may remove the fake change points and include only the real change points in the pixel comparison image data.

When the real change points are determined, the processor 200 may perform edge correction with respect to the fake change points in operation S360. For example, the processor 200 may perform correction by removing the fake change points from the pixel comparison image data. In this case, the processor 200 may determine a pixel value of the fake change points to be 0.

Figure 7:
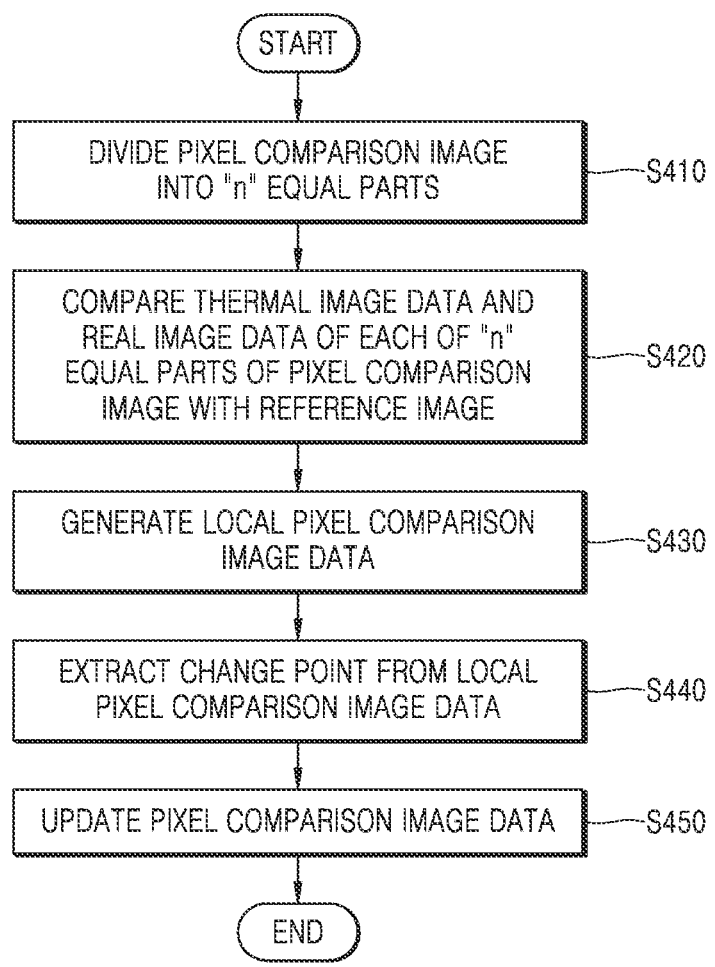
FIG. 7 is a flowchart of an update of image data in an image processing method, according to some embodiments.

FIG. 7 is a flowchart of an update of image data in an image processing method, according to some embodiments.

Referring to FIG. 7, the processor 200 may divide a pixel comparison image into "n" equal parts in operation S410. For example, the processor 200 may process thermal image data and real image data, divide each of a thermal image and a real image into "n" equal parts, and locally generate pixel comparison image data for each of the "n" equal parts.

After the pixel comparison image is divided into "n" equal parts, the processor 200 may compare thermal image data and real image data of each of the "n" equal parts of the pixel comparison image with reference image data in operation S420. For example, each of "n" equal parts of a thermal image and each of "n" equal parts of a real image may be compared with the reference image pixel-by-pixel, wherein each of the "n" equal parts of the thermal image may be referred to as a local thermal image and each of the "n" equal parts of the real image may be referred to as a local real image.

As a result of comparing local thermal images and local real images with the reference image, the processor 200 may generate local pixel comparison image data in operation S430.

After the local pixel comparison image data is generated, the processor 200 may extract a change point from the local pixel comparison image data in operation S440. For example, in some embodiments, the processor 200 may extract one or more change points from the local pixel comparison image data. The processor 200 may accurately extract change points by repeatedly performing the main processing described above on "n" equal parts of an image.

By repeating operations S410 to S440, the processor 200 may update the pixel comparison image data in operation S450.

Figure 8:
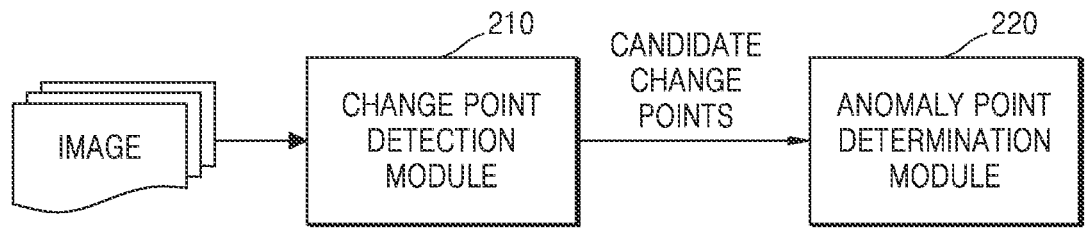
FIG. 8 illustrates image processing modules of a processor, according to some embodiments.
Figure 9:
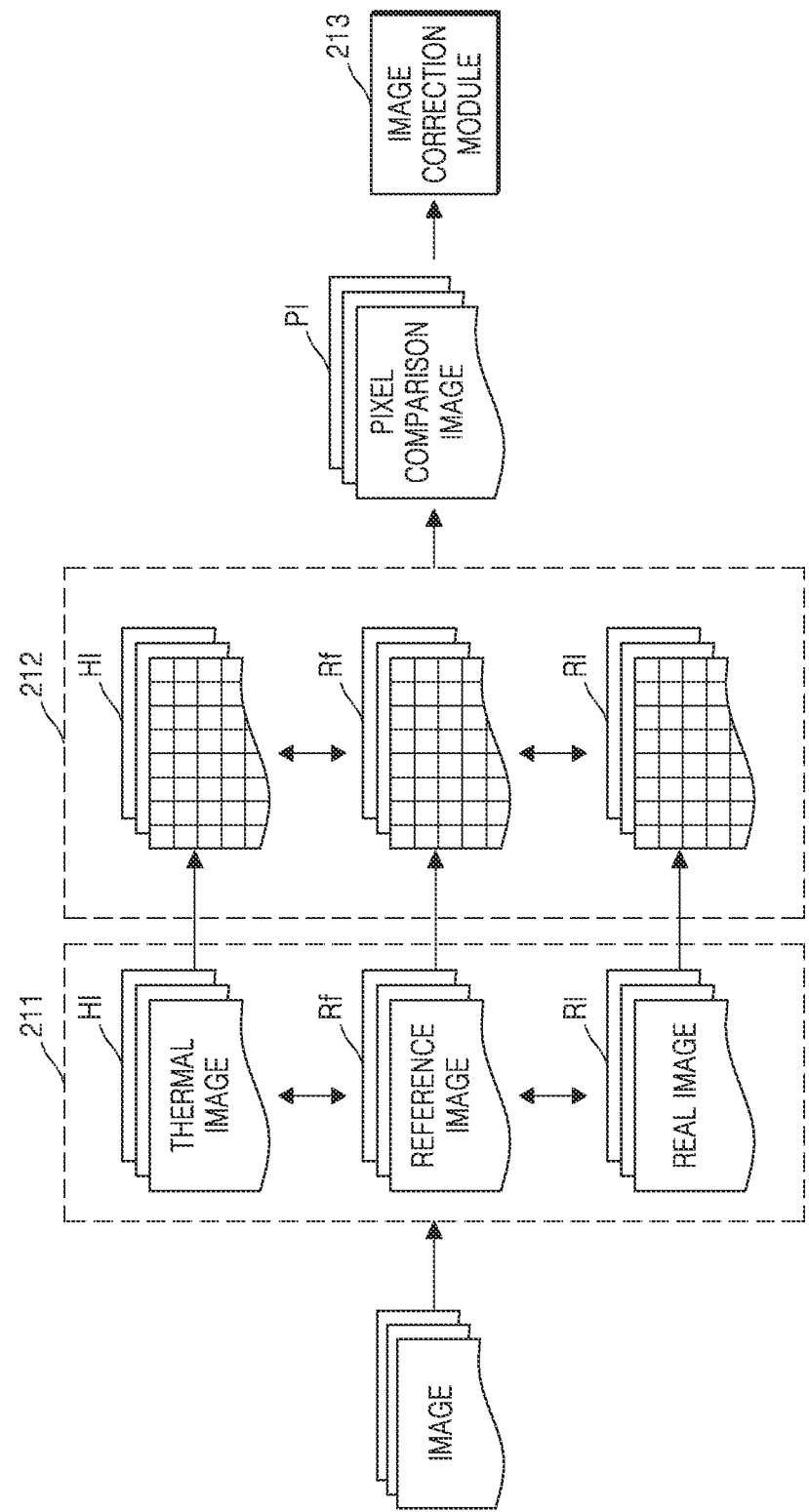
FIG. 9 illustrates image processing performed by a processor, according to some embodiments.

FIG. 8 illustrates image processing modules of the processor 200, according to some embodiments. FIG. 9 illustrates image processing performed by the processor 200, according to some embodiments.

Referring to FIG. 8, the processor 200 may include a change point detection module 210 and an anomaly point determination module 220.

The change point detection module 210 may receive image data and extract change points from the image data. Referring to FIGS. 8 and 9, the change point detection module 210 may include an image separation module 211, which separates image data into a thermal image HI and a real image RI. The image separation module 211 may align the thermal image HI with the real image RI, based on a reference image Rf.

The change point detection module 210 may further include an image divider module 212. The image divider module 212 may divide the thermal image HI, the real image RI, and the reference image Rf into certain units and then locally compare divided parts of the thermal image HI and the real image RI with divided parts of the reference image Rf. For example, a first divided part of the thermal image HI may be compared with a first divided part of the reference image Rf, and a first divided part of the real image RI may be compared with the first divided part of the reference image Rf. As a result of respectively comparing the divided parts of each of the thermal image HI and the real image RI with the divided parts of the reference image Rf, respectively, the change point detection module 210 may generate a pixel comparison image PI.

The change point detection module 210 may further include an image correction module 213. The change point detection module 210 may perform correction of the pixel comparison image PI and then extract a change point from the pixel comparison image PI. A change point may include a pixel, which has a relatively high pixel value in the pixel comparison image PI. The change point detection module 210 may extract candidate change points from a plurality of change points.

Figure 10:
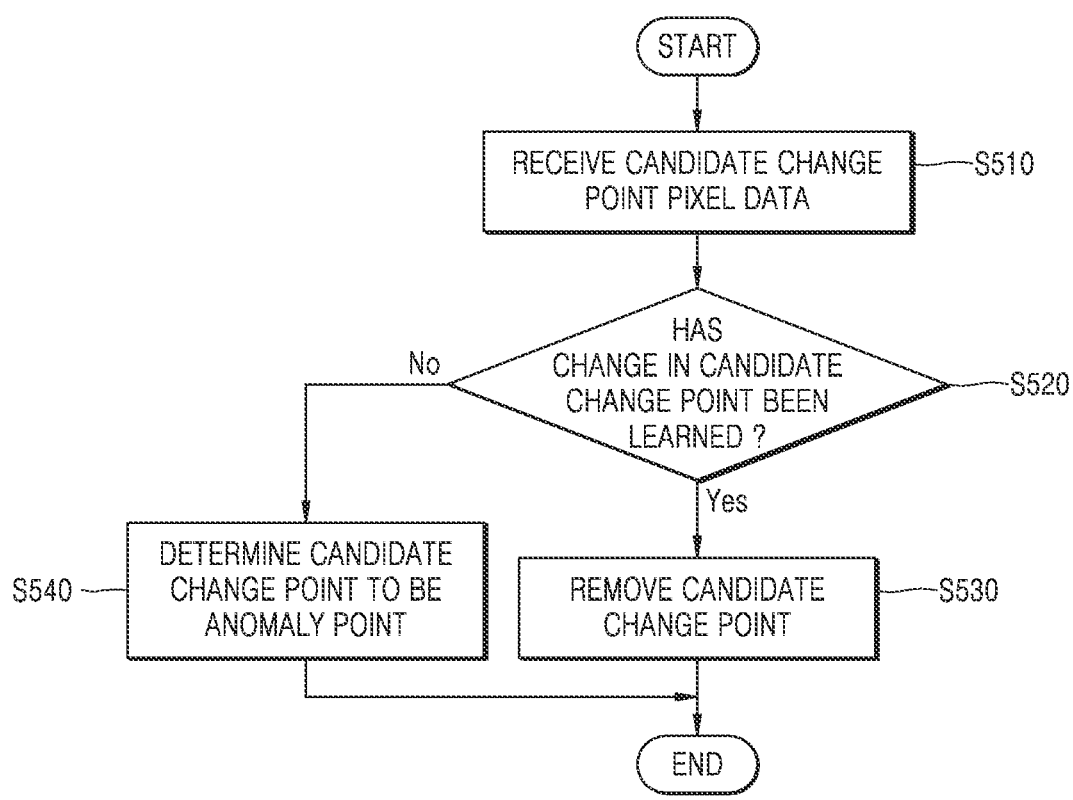
FIG. 10 is a flowchart of a process, in which a processor selects an anomaly point, according to some embodiments.

FIG. 10 is a flowchart of a process, in which the processor 200 selects an anomaly point, according to some embodiments. In some embodiments, the process illustrated in FIG. 10 may be performed by the anomaly point determination module 220 of FIG. 8.

Referring to FIG. 10, the anomaly point determination module 220 of the processor 200 may receive candidate change point pixel data from the change point detection module 210 in operation S510. In some embodiments, the change point detection module 210 may transmit the candidate change point pixel data, which is extracted as a result of the K-means algorithm, to the anomaly point determination module 220. When receiving the candidate change point pixel data, the anomaly point determination module 220 may determine whether a change in a candidate change point has been learned in operation S520.

In some embodiments, the learning of a change point may be continuously performed by the processor 200. For example, the processor 200 may determine whether a past change point is a real change point by comparing change point data determined in the past with a real image and learn a result of the determination through deep learning.

When the change in the candidate change point has been learned, the processor 200 may remove the candidate change point in operation S530. Otherwise, when the change in the candidate change point has not been learned, the processor 200 may determine the candidate change point to be an anomaly point in operation S540.

Figure 11:
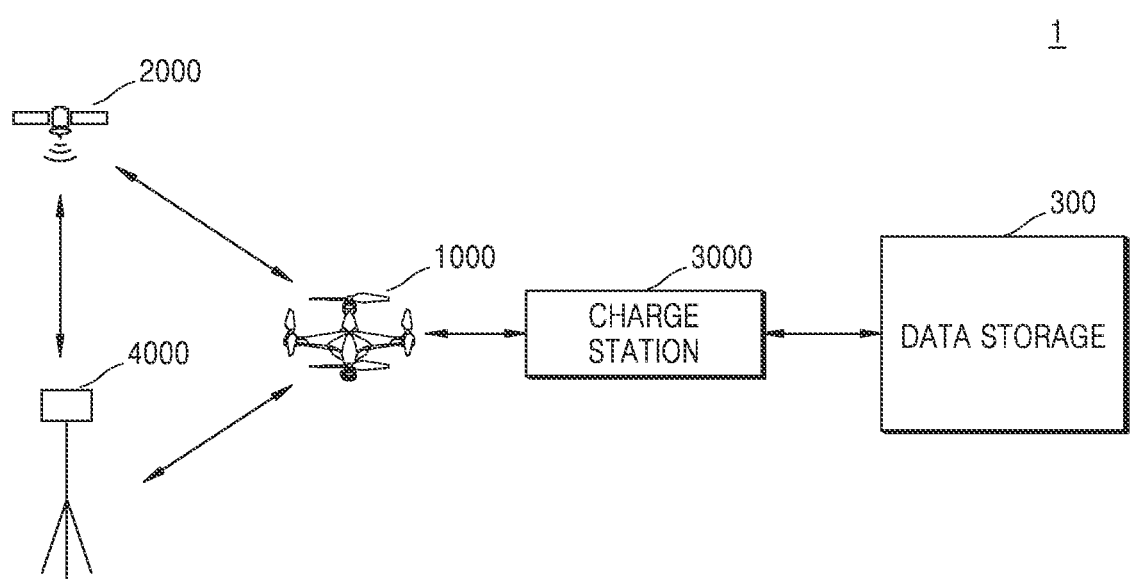
FIG. 11 illustrates an image sensing system for drone, which includes a charge station and a data storage, according to some embodiments.

FIG. 11 illustrates the image sensing system 1 for drone, which includes a charge station 3000 and the data storage 300, according to some embodiments.

According to some embodiments, the image sensing system 1 for drone may include the drone 1000, the communication satellite 2000, the charge station 3000, a mobile base station 4000, and the data storage 300.

As described above with reference to FIG. 1, the drone 1000 may include the image sensor 100 and capture an external image. For example, the drone 1000 may film or image a surrounding site or a factory in a surrounding area while flying. According to some embodiments, the drone 1000 may use RTK-GPS technology.

The communication satellite 2000 may be outside the drone 1000 and may determine the location of the drone 1000 and share image information of an area, which is currently being filmed by the drone 1000, with the drone 1000, based on location information obtained as a result of the determination. The communication satellite 2000 may include a GPS satellite but is not limited thereto. According to some embodiments, the drone 1000 may implement an RTK-GPS function, which shares a real-time location with the communication satellite 2000.

According to some embodiments, the drone 1000 may automatically take off from and land on the charge station 3000. The charge station 3000 may include a communication circuit (not shown), which communicates with the drone 1000. According to some embodiments, the processor 200 may be mounted on the charge station 3000. In this case, the drone 1000 may include only the image sensor 100 and transmit a captured image to the charge station 3000 in real time. The charge station 3000 has a relatively stable power supply and does not have constraints in space, compared to the drone 1000. Accordingly, when the processor 200 is mounted on the charge station 3000, an image processing method according to some embodiments may be more quickly performed than when the processor 200 is mounted on the drone 1000. In the case where the processor 200 is mounted on the charge station 3000, the charge station 3000 may reliably share data with the data storage 300.

The mobile base station 4000 may communicate with the communication satellite 2000 and the drone 1000, control the position, angle, or operation of the drone 1000, and quickly determine information about a filmed or imaged area. When the mobile base station 4000 communicates with the communication satellite 2000 in real time, the processor 200 may quickly receive a reference image from the data storage 300.

As described above with reference to FIG. 1, the data storage 300 may be outside the drone 1000 and may share image data with the drone 1000. For example, because the data storage 300 is outside the drone 1000, the data storage 300 may be hardware having a relatively large storage capacity. The drone 1000 may store images, which are captured in real time, in the data storage 300 and may use the images stored in the data storage 300 when extracting a change point or an anomaly point from a captured image. For example, the data storage 300 may include a server outside the drone 1000. In this case, the drone 1000 may store captured images in an external server and retrieve an existing image of a currently filmed area from the external server through communication with the communication satellite 2000. The existing image retrieved from the external server may be used as a reference image for generation of changed pixel image data, as described below.

Figure 12:
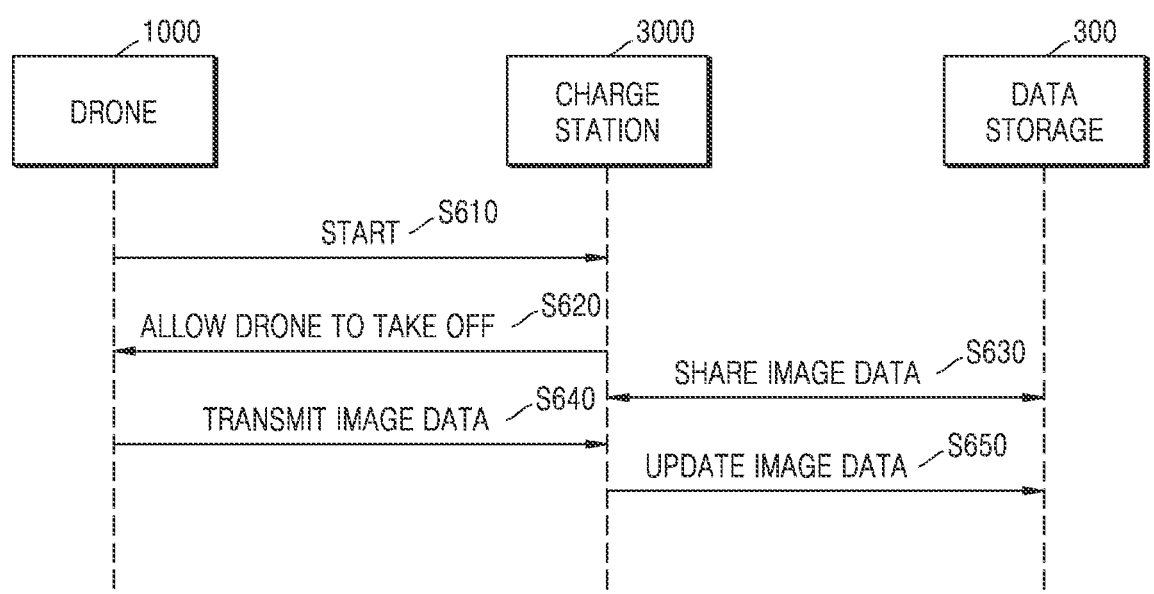
FIG. 12 illustrates an operating method of an image sensing system for drone, according to some embodiments.

FIG. 12 illustrates an operating method of the image sensing system 1 for drone, according to some embodiments.

Referring to FIG. 12, in the case where the processor 200 is mounted on the charge station 3000, image processing may start when the drone 1000 communicates with the charge station 3000 in operation S610 and takes off from the charge station 3000 in operation S620.

When the drone 1000 takes off from the charge station 3000, the data storage 300 may share image data of an area, in which the drone 1000 is located, with the charge station 3000 in operation S630. For example, the charge station 3000 may retrieve an image from the data storage 300, based on location information of the drone 1000, which is determined by the communication satellite 2000, and use the image as a reference image. That is, in some embodiments, the charge station 3000 may send a command to the data storage 300 to read image data from the data storage 300 based on a location of the drone 1000, and the data storage 300 may share the image data.

The drone 1000 may continuously capture images and transmit data of the captured images to the charge station 3000 in operation S640.

When the image data is transmitted to the charge station 3000, the processor 200 mounted on the charge station 3000 may extract change points or anomaly points by repeating the operations described with reference to FIGS. 5 to 7 and update the image data in operation S650. Updated image data may be stored in the data storage 300.

Figure 13:
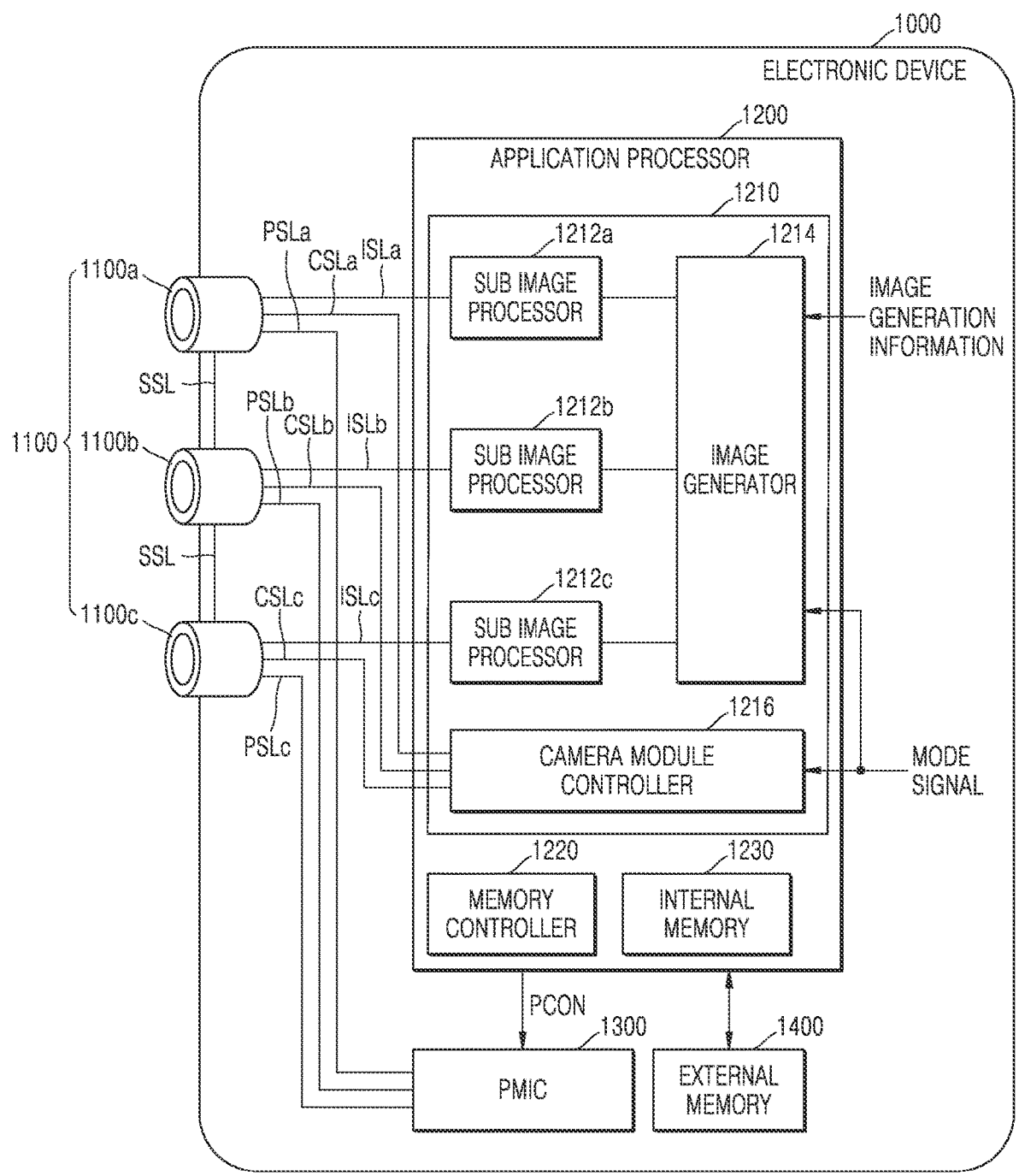
FIGS. 13 to 15 illustrate various examples of using an image sensor for a drone, according to some embodiments.
Figure 14:
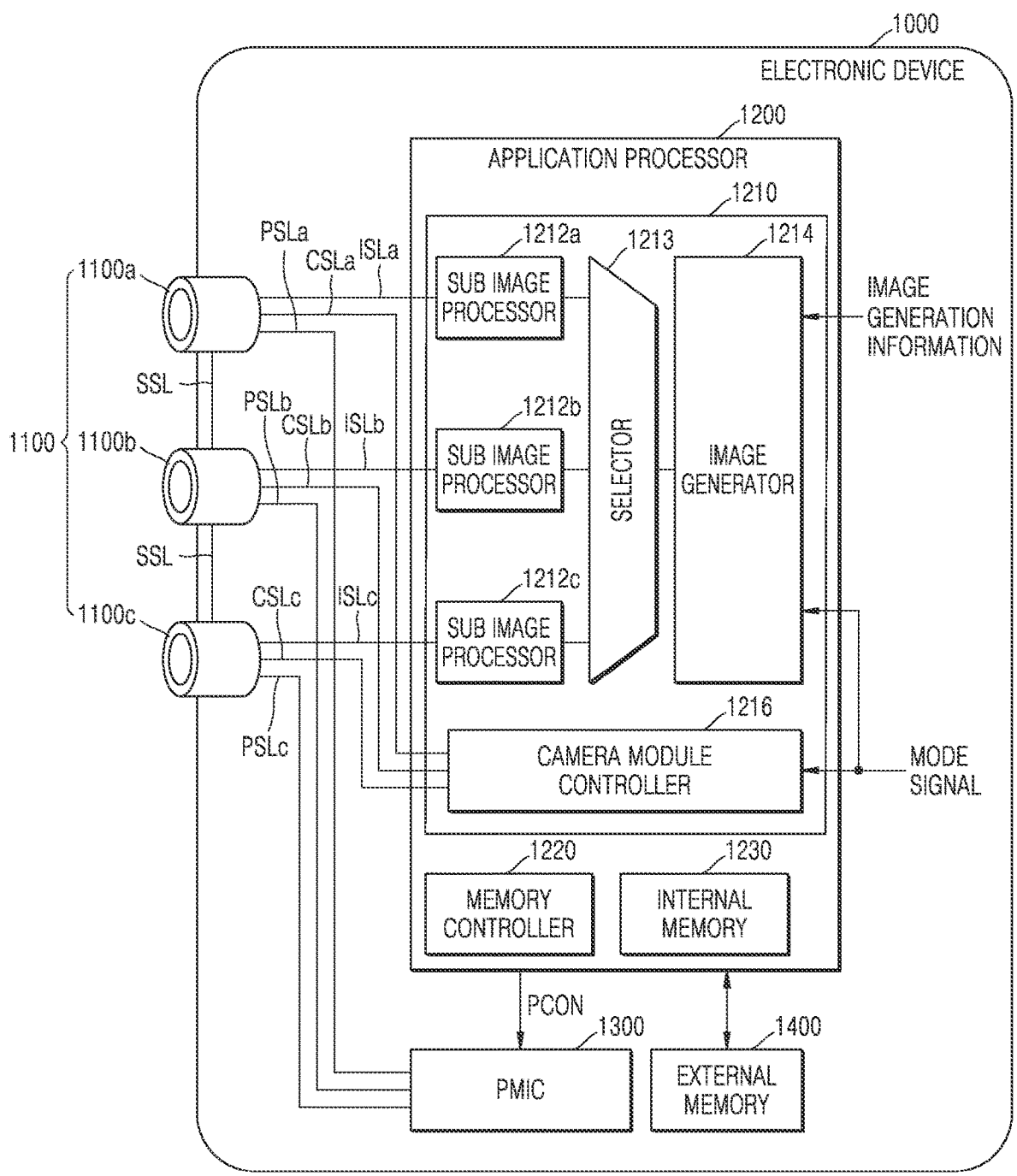
Figure 15:
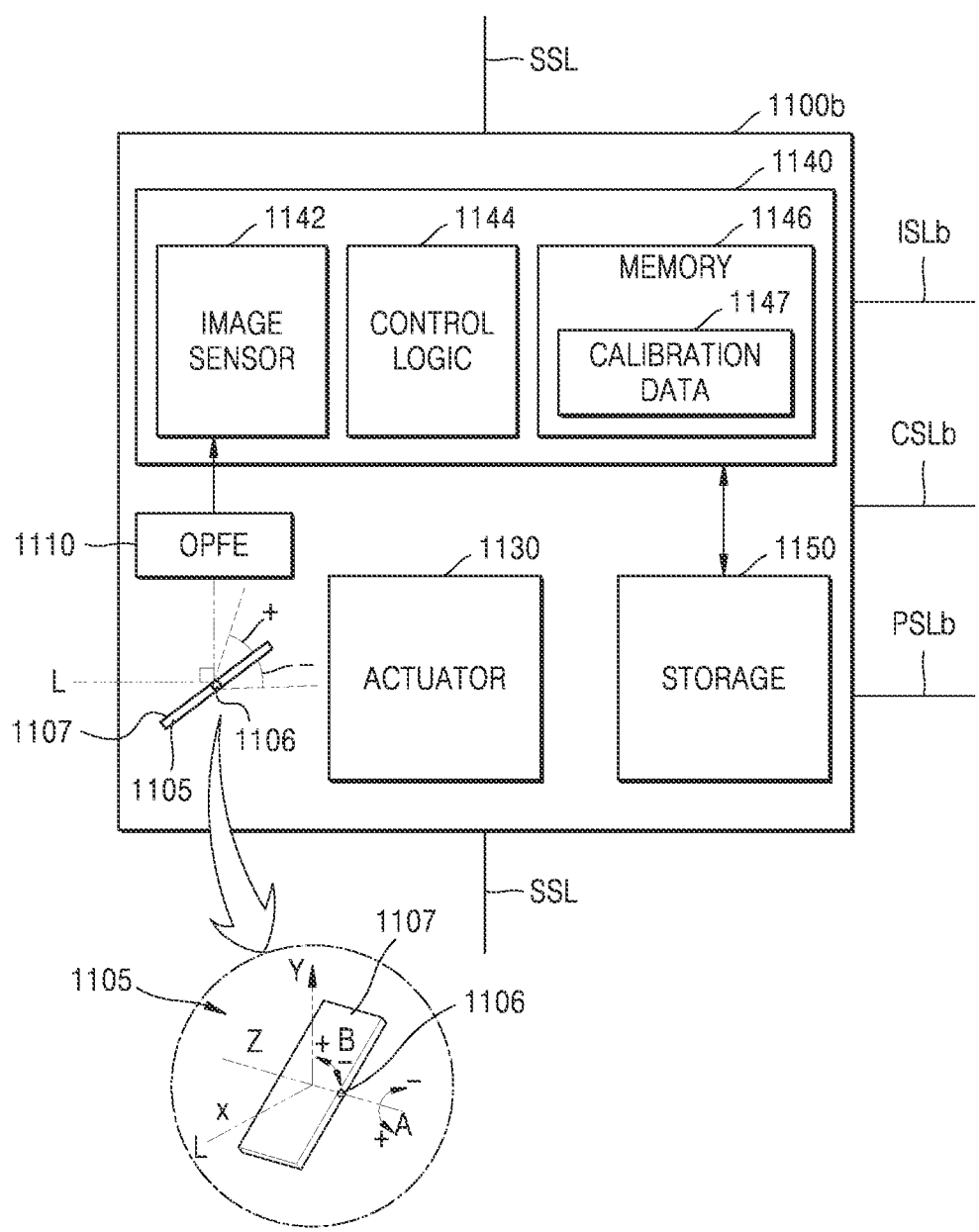

FIGS. 13 to 15 illustrate various examples of using an image sensor for drone shooting, according to some embodiments.

FIG. 13 is a block diagram of the drone 1000 including a multi-camera module. FIG. 15 is a detailed block diagram of a camera module in FIG. 13.

Referring to FIG. 13, the drone 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 13, embodiments are not limited thereto. In some embodiments, the camera module group 1100 may be modified to include only two camera modules or include "x" camera modules, where "x" is a natural number of at least 4.

The detailed configuration of the camera module 1100b is described with reference to FIG. 15 below. The descriptions below may also be applied to the other camera modules 1100a and 1100c.

Referring to FIG. 15, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some embodiments, an A-direction maximum rotation angle of the prism 1105 may be less than or equal to 15 degrees in a plus (+) A direction and greater than 15 degrees in a minus (−) A direction, but embodiments are not limited thereto.

In some embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some embodiments, the prism 1105 may move the reflective surface 1107 of the light reflecting material in the third direction Z parallel with an extension direction of the central shaft 1106.

In some embodiments, the camera module 1100b may include at least two prisms and variously change the path of the light L by using the prisms. For example, the camera module 1100b may change the direction of the path of the light L incident in the first direction X to the second direction Y perpendicular to the first direction X, then to the first direction X or the third direction Z, and then to the second direction Y.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100b is Z, the optical zoom ratio of the camera module 1100b may be changed to 3Z, 5Z, or greater by moving the "m" optical lenses included in the OPFE 1110.

The actuator 1130 may move the OPFE 1110 (or an optical lens) (hereinafter, referred to as an optical lens) to a certain position. For example, the actuator 1130 may adjust the position of the optical lens such that an image sensor 1142 is at a focal length of the optical lens for accurate sensing.

The image sensing device 1140 may include the image sensor 1142, a control logic 1144, and a memory 1146. The image sensor 1142 may sense an image of an object by using the light L provided through the optical lens. The control logic 1144 may generally control operations of the camera module 1100b and process a sensed image. For example, the control logic 1144 may control operation of the camera module 1100b, according to a control signal provided through a control signal line CSLb, and extract image data corresponding to a particular image (e.g., the face, arms, legs, or the like of a person) from the sensed image.

In some embodiments, the control logic 1144 may perform image processing, such as encoding and/or noise reduction, on the sensed image.

The memory 1146 may store information, such as calibration data 1147, for the operation of the camera module 1100b. The calibration data 1147 may include information, which is used for the camera module 1100b to generate image data using the light L provided from outside. For example, the calibration data 1147 may include information about the degree of rotation described above, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, two chips may be stacked, wherein the image sensor 1142 may be formed in one of the chips, and the control logic 1144, the storage 1150, and the memory 1146 may be formed in the other chip.

In some embodiments, the storage 1150 may include electrically erasable programmable read-only memory (EEPROM), but embodiments are not limited thereto. In some embodiments, the image sensor 1142 may include a pixel array, and the control logic 1144 may include an ADC and an image signal processor processing a sensed image.

Referring to FIGS. 13 and 15, in some embodiments, each of the camera modules 1100a, 1100b, and 1100c may include the actuator 1130. Accordingly, the camera modules 1100a, 1100b, and 1100c may include the calibration data 1147, which is the same or different among the camera modules 1100a, 1100b, and 1100c according to the operation of the actuator 1130 included in each of the camera modules 1100a, 1100b, and 1100c.

In some embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, embodiments are not limited thereto.

In some embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some embodiments, at least two camera modules (e.g., 1100a and 1100b) among the camera modules 1100a, 1100b, and 1100c may have different field-of-views. In this case, the two camera modules (e.g., 1100a and 1100b) among the camera modules 1100a, 1100b, and 1100c may respectively have different optical lenses, but embodiments are not limited thereto.

In some embodiments, the camera modules 1100a, 1100b, and 1100c may have different field-of-views from one another. For example, the camera module 1100a may include an ultrawide camera, the camera module 1100b may include a wide camera, and the camera module 1100c may include a telecamera, but embodiments are not limited thereto. In this case, the camera modules 1100a, 1100b, and 1100c may respectively have different optical lenses, but embodiments are not limited thereto.

In some embodiments, the camera modules 1100a, 1100b, and 1100c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b, and 1100c.

Referring back to FIG. 13, the application processor 1200 may include an image processing unit 1210, a memory controller 1220, and an internal memory 1230. The application processor 1200 may be separately implemented from the camera modules 1100a, 1100b, and 1100c. For example, the application processor 1200 may be implemented in a different semiconductor chip than the camera modules 1100a, 1100b, and 1100c.

The image processing unit 1210 may include a plurality of sub image processors 1212a, 1212b, and 1212c, an image generator 1214, and a camera module controller 1216.

The image processing unit 1210 may include as many sub image processors 1212a, 1212b, and 1212c as the camera modules 1100a, 1100b, and 1100c.

Image data generated from the camera module 1100a may be provided to the sub image processor 1212a through an image signal line ISLa, image data generated from the camera module 1100b may be provided to the sub image processor 1212b through an image signal line ISLb, and image data generated from the camera module 1100c may be provided to the sub image processor 1212c through an image signal line ISLc. Such image data transmission may be performed using, for example, a mobile industry processor interface (MIPI)-based camera serial interface (CSI), but embodiments are not limited thereto.

In some embodiments, a single sub image processor may be provided for a plurality of camera modules. For example, differently from FIG. 13, the sub image processors 1212a and 1212c may not be separate from each other but may be integrated into a single sub image processor, and the image data provided from the camera module 1100a or the camera module 1100c may be selected by a selection element (e.g., a multiplexer) and then provided to the integrated sub image processor. At this time, the sub image processor 1212b may not be integrated and may receive image data from the camera module 1100b.

In some embodiments, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. In addition, while the image data processed by the sub image processor 1212b may be directly provided to the image generator 1214, one of the image data processed by the sub image processor 1212a and the image data processed by the sub image processor 1212c may be selected by a selection element (e.g., a multiplexer) and then provided to the image generator 1214.

Each of the sub image processors 1212a, 1212b, and 1212c may perform image processing, such as bad pixel correction, 3A adjustment (i.e., autofocus correction, auto-white balance, and auto-exposure), noise reduction, sharpening, gamma control, or remosaic, on image data provided from a corresponding one of the camera modules 1100a, 1100b, and 1100c.

In some embodiments, remosaic signal processing may be performed by each of the camera modules 1100a, 1100b, and 1100c, and a processing result may be provided to each of the sub image processors 1212a, 1212b, and 1212c.

The image data processed by each of the sub image processors 1212a, 1212b, and 1212c may be provided to the image generator 1214. The image generator 1214 may generate an output image using the image data provided from each of the sub image processors 1212a, 1212b, and 1212c according to image generation information or a mode signal.

In detail, the image generator 1214 may generate the output image by merging at least portions of respective pieces of image data, which are respectively generated from the sub image processors 1212a, 1212b, and 1212c, according to the image generation information or the mode signal. In some embodiments, the image generator 1214 may generate the output image by selecting one of pieces of image data, which are respectively generated from the sub image processors 1212a, 1212b, and 1212c, according to the image generation information or the mode signal.

In some embodiments, the image generation information may include a zoom signal or a zoom factor. In some embodiments, the mode signal may be based on a mode selected by a user.

When the image generation information includes a zoom signal or a zoom factor and the camera modules 1100a, 1100b, and 1100c have different field-of-views, the image generator 1214 may perform different operations according to different kinds of zoom signals. For example, when the zoom signal is a first signal, the image generator 1214 may generate an output image using image data output from the sub image processor 1212b and image data output from the sub image processor 1212a between the image data output from the sub image processor 1212a and image data output from the sub image processor 1212c. When the zoom signal is a second signal different from the first signal, the image generator 1214 may generate an output image using image data output from the sub image processor 1212b and image data output from the sub image processor 1212c between image data output from the sub image processor 1212a and the image data output from the sub image processor 1212c. When the zoom signal is a third signal different from the first signal and the second signal, the image generator 1214 may generate an output image by selecting one of the pieces of image data respectively output from the sub image processors 1212a, 1212b, and 1212c, instead of performing the merging. However, embodiments are not limited thereto, and a method of processing image data may be changed whenever necessary.

Referring to FIG. 14, in some embodiments, the image processing unit 1210 may further include a selector 1213, which selects and transmits the outputs of the sub image processors 1212a, 1212b, and 1212c to the image generator 1214.

In this case, the selector 1213 may perform a different operation according to a zoom signal or a zoom factor. For example, when the zoom signal is a fourth signal (for example, when a zoom ratio is a first ratio), the selector 1213 may select and transmit one of the outputs of the sub image processors 1212a, 1212b, and 1212c to the image generator 1214.

When the zoom signal is a fifth signal different from the fourth signal (for example, when the zoom ratio is a second ratio), the selector 1213 may sequentially transmit "p" outputs (where "p" is a natural number of at least 2) among the outputs of the sub image processors 1212a, 1212b, and 1212c to the image generator 1214. For example, the selector 1213 may sequentially transmit the output of the sub image processor 1212b and the output of the sub image processor 1212c to the image generator 1214. For example, the selector 1213 may sequentially transmit the output of the sub image processor 1212a and the output of the sub image processor 1212b to the image generator 1214. The image generator 1214 may merge the sequentially received "p" outputs with each other and generate a single output image.

At this time, image processing, such as demosaic, down scaling to a video/preview resolution, gamma correction, and high dynamic range (HDR) processing, may be performed by the sub image processors 1212a, 1212b, and 1212c, and processed image data may be transmitted to the image generator 1214. Accordingly, although the processed image is provided from the selector 1213 to the image generator 1214 through a single signal line, the image merging operation of the image generator 1214 may be performed at a high speed.

In some embodiments, the image generator 1214 may receive a plurality of pieces of image data, which have different exposure times, from at least one of the sub image processors 1212a, 1212b, and 1212c and perform HDR processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separate from one another.

One (e.g., the camera module 1100b) of the camera modules 1100a, 1100b, and 1100c may be designated as a master camera according to the mode signal or the image generation signal including a zoom signal, and the other camera modules (e.g., 1100a and 1100c) may be designated as slave cameras. Such designation information may be included in a control signal and provided to each of the camera modules 1100a, 1100b, and 1100c through a corresponding one of control signal lines CSLa, CSLb, and CSLc, which are separate from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100a may operate as a master and the camera module 1100b may operate as a slave. Contrarily, when the zoom factor indicates a high zoom ratio, the camera module 1100b may operate as a master and the camera module 1100a may operate as a slave.

In some embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal, based on the sync enable signal, and may provide the sync signal to the camera modules 1100a and 1100c through a sync signal line SSL. The camera modules 1100a, 1100b, and 1100c may be synchronized with the sync signal and may transmit image data to the application processor 1200.

In some embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed, based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal, i.e., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub image processors 1212a, 1212b, and 1212c of the image processing unit 1210 may perform the decoding and may also perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100a, 1100b, and 1100c. For example, under control by the application processor 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the application processor 1200. The power control signal PCON may include a power adjustment signal for each operation mode of the camera modules 1100a, 1100b, and 1100c. For example, the operation mode may include a low-power mode. At this time, the power control signal PCON may include information about a camera module to operate in the low-power mode and a power level to be set. The same or different levels of power may be respectively provided to the camera modules 1100a, 1100b, and 1100c. The level of power may be dynamically changed.

While various embodiments have been particularly shown and described with reference to the drawings, it will be understood that various changes in form and details may be made therein without departing from the spirit and scope of the following claims.

What is claimed is:

1. An image processing device for a drone, the image processing device comprising:
a memory configured to receive and store image data; and
a processor configured to:
perform pre-processing on the image data by separating the image data into thermal image data and real image data; and
perform image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

2. The image processing device of claim 1, wherein, during the pre-processing, the processor is further configured to put an alignment reference mark on a structure in the reference image and align a thermal image that corresponds to the thermal image data with a real image that corresponds to the real image data, based on the alignment reference mark.

3. The image processing device of claim 1, wherein, during the pre-processing, the processor is further configured to set a region of interest and to set a non-region of interest.

4. The image processing device of claim 3, wherein, during the pre-processing, the processor is further configured to mask the non-region of interest.

5. The image processing device of claim 1, wherein, during the image processing, the processor is further configured to remove noise by performing Gaussian blurring on the thermal image data and the real image data.

6. The image processing device of claim 1, wherein, during the image processing, the processor is further configured to convert the thermal image data and the real image data into a color mode and generate the pixel comparison image data, based on a first pixel value difference between the data of the reference image and converted thermal image data and a second pixel value difference between the data of the reference image and converted real image data.

7. The image processing device of claim 6, wherein, during the image processing, the processor is further configured to determine the color mode based on user customization.

8. The image processing device of claim 1, wherein, during the image processing, the processor is further configured to determine candidate change points, identify a thermal image part and a real image part of the pixel comparison image, each of the thermal image part and the real image part including a candidate change point having a highest pixel value among the candidate change points, mask a local part of the pixel comparison image, the local part corresponding to the thermal image part and the real image part, compare the candidate change point with the data of the reference image, and extract the change point based on a comparison result.

9. The image processing device of claim 1, wherein, during the image processing, the processor is further configured to determine, as a candidate change point, a point at which a difference between each of the thermal image data and the real image data and the data of the reference image is greater than an average pixel value of the reference image, compare a thermal data value and a real data value of the candidate change point with a data value of the reference image by using a K-means algorithm, and determine the change point based on a comparison result.

10. The image processing device of claim 1, further comprising:
a charge station configured to exchange the image data with the drone; and
a data storage that stores the image data,
wherein the processor is mounted on the charge station.

11. An image processing method performed by a drone, the image processing method comprising:
capturing an external image to obtain image data; and
processing the image data,
wherein the processing of the image data includes:
performing pre-processing on the image data by separating the image data into thermal image data and real image data; and
performing image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

12. The image processing method of claim 11, wherein the performing the pre-processing includes putting an alignment reference mark on a structure in the reference image and aligning a thermal image that corresponds to the thermal image data with a real image that corresponds to the real image data, based on the alignment reference mark.

13. The image processing method of claim 11, wherein the performing of the pre-processing includes setting a region of interest and setting a non-region of interest.

14. The image processing method of claim 13, wherein the performing of the image processing includes masking the non-region of interest.

15. The image processing method of claim 11, wherein the performing the image processing includes removing noise by performing Gaussian blurring on the thermal image data and the real image data.

16. The image processing method of claim 11, wherein the performing of the image processing includes converting the thermal image data and the real image data into a color mode and generating the pixel comparison image data, based on a first pixel value difference between the data of the reference image and converted thermal image data and a second pixel value difference between the data of the reference image and converted real image data.

17. The image processing method of claim 16, wherein the performing of the image processing includes determining the color mode based on user customization.

18. The image processing method of claim 11, wherein the performing of the image processing includes determining candidate change points, identifying a thermal image part and a real image part of the pixel comparison image, each of the thermal image part and the real image part including a candidate change point having a highest pixel value among the candidate change points, masking a local part of the pixel comparison image, the local part corresponding to the thermal image part and the real image part, comparing the candidate change point with the data of the reference image, and extracting the change point based on a comparison result.

19. The image processing method of claim 11, wherein the performing of the image processing includes determining, as a candidate change point, a point at which a difference between each of the thermal image data and the real image data and the data of the reference image is greater than an average pixel value of the reference image, comparing a thermal data value and a real data value of the candidate change point with a data value of the reference image by using a K-means algorithm, and determining the change point based on a comparison result.

20. A drone image processing processor configured to:
perform pre-processing on image data by separating the image data into thermal image data and real image data; and
perform image processing by generating pixel comparison image data as a result of comparing pixel data of the thermal image data and pixel data of the real image data with data of a reference image, correcting data corresponding to an edge of a pixel comparison image in the pixel comparison image data, extracting a change point from the pixel comparison image data that has undergone the correction, and determining whether a change in the change point is in a normal category.

* * * * *